US012758005B2

(12) United States Patent
Barnes

(10) Patent No.: US 12,758,005 B2
(45) Date of Patent: Oct. 13, 2026

(54) WASHING APPARATUS

(71) Applicant: David Barnes, Oklahoma City, OK (US)

(72) Inventor: David Barnes, Oklahoma City, OK (US)

( * ) Notice: Subject to any disclaimer, the term of this patent is extended or adjusted under 35 U.S.C. 154(b) by 477 days.

(21) Appl. No.: 18/367,724

(22) Filed: Sep. 13, 2023

(65) Prior Publication Data

US 2025/0082095 A1 Mar. 13, 2025

(51) Int. Cl.

| | |
|---|---|
| ***A46B 11/06*** | (2006.01) |
| ***A46B 13/00*** | (2006.01) |
| ***A46B 13/02*** | (2006.01) |
| ***A46B 13/06*** | (2006.01) |
| ***A46B 15/00*** | (2006.01) |
| ***B08B 1/12*** | (2024.01) |
| ***E04D 15/00*** | (2006.01) |

(52) U.S. Cl.

CPC ............ *A46B 11/066* (2013.01); *A46B 13/02* (2013.01); *A46B 13/06* (2013.01); *A46B 15/0022* (2013.01); *A46B 15/0036* (2013.01); *A46B 13/001* (2013.01); *A46B 2200/30* (2013.01); *B08B 1/12* (2024.01); *E04D 15/006* (2013.01)

(58) Field of Classification Search

CPC ..... A46B 11/06; A46B 11/063; A46B 11/066; A46B 15/0036; A46B 13/06; A46B 13/04; A46B 13/001; A46B 2200/3033; A46B 15/0022; A46B 13/02; B08B 3/02; A47L 1/02; A47L 1/08; E04D 15/006; Y10T 403/32501; F16B 2/065; B25G 1/04

USPC .............................................................. 15/24

See application file for complete search history.

(56) References Cited

U.S. PATENT DOCUMENTS

| | | | | |
|---|---|---|---|---|
| 1,526,384 A * | 2/1925 | Simpson | A47L 13/11 | 37/285 |
| 4,547,966 A * | 10/1985 | Eden | A01G 3/06 | 30/DIG. 7 |
| 6,032,321 A | 3/2000 | Shirey | | |
| 6,045,284 A * | 4/2000 | Chiu | B25G 1/04 | 285/302 |
| D485,031 S | 1/2004 | Anderson | | |
| 6,709,529 B1 | 3/2004 | Mekwinski | | |
| 6,862,769 B1 * | 3/2005 | Dalton, Sr. | A46B 13/06 | 15/24 |
| 8,375,500 B1 | 2/2013 | Aguirre | | |
| 9,320,347 B1 | 4/2016 | Skarzynski | | |
| 9,440,622 B2 | 9/2016 | Hagans | | |

(Continued)

FOREIGN PATENT DOCUMENTS

| | | | | |
|---|---|---|---|---|
| CN | 114798541 | * 7/2022 | B08B 1/04 |
| WO | WO2018051525 | 3/2018 | |

*Primary Examiner* — Laura C Guidotti

(57) ABSTRACT

A washing apparatus for viewing an obscured surface to be cleaned via a camera includes a base tube defining a base channel and an extension tube defining an extension channel. The extension tube is removably attachable to the base tube such that the base channel and the extension channel are in fluid communication with each other. A cleaning attachment is removably attachable to either one of the base tube and the extension tube and may be shaped to allow fluid to flow from the base channel or the extension channel and toward a surface to be cleaned. A camera is attached to the extension tube and is oriented to face the cleaning attachment when the cleaning attachment is attached to the extension tube.

19 Claims, 11 Drawing Sheets

(56) References Cited

U.S. PATENT DOCUMENTS

| | | | | |
|---|---|---|---|---|
| 11,420,235 | B2 * | 8/2022 | Gibson | F21V 33/004 |
| 2004/0146333 | A1 * | 7/2004 | Fu | B08B 1/143<br>401/138 |
| 2004/0250367 | A1 | 12/2004 | Fraser | |
| 2009/0025164 | A1 * | 1/2009 | Kim | A46B 11/066<br>15/144.1 |
| 2010/0288520 | A1 * | 11/2010 | Dayton | E04D 13/0765<br>173/1 |
| 2012/0103373 | A1 | 5/2012 | Grobler | |

* cited by examiner

WASHING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to washing apparatuses and more particularly pertains to a new washing apparatus for viewing an obscured surface to be cleaned via a camera.

(2) Description of Related Art Including Information Disclosed Under 37 CFR 1.97 and 1.98

The prior art describes myriad washing apparatuses for washing and scrubbing a surface while spaced from the surface using an elongated member to place a cleaning implement on the surface from afar. However, the prior art fails to disclose a camera being mounted to the elongated member and oriented to face the cleaning implement during use of the washing apparatus so that a user may view images captured by the camera. Such an apparatus would be advantageous over the prior art by enabling viewing of obscured surfaces during cleaning of those surfaces.

BRIEF SUMMARY OF THE INVENTION

An embodiment of the disclosure meets the needs presented above by generally comprising a base tube defining a base channel therein which is open on a first end and a second end of the base tube. An extension tube is removably couplable to the second end of the base tube. The extension tube defines an extension channel therein which is open on a proximal end and a distal end of the extension tube with respect to the base tube. The extension channel is in fluid communication with the base channel when the extension tube is coupled to the second end of the base tube. A cleaning attachment is removably couplable to the distal end of the extension tube. A camera is mounted to the extension tube and is oriented to face a selected cleaning attachment of the plurality of cleaning attachments when the selected cleaning attachment is coupled to the distal end of the extension tube. A processor is operatively coupled to the camera.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
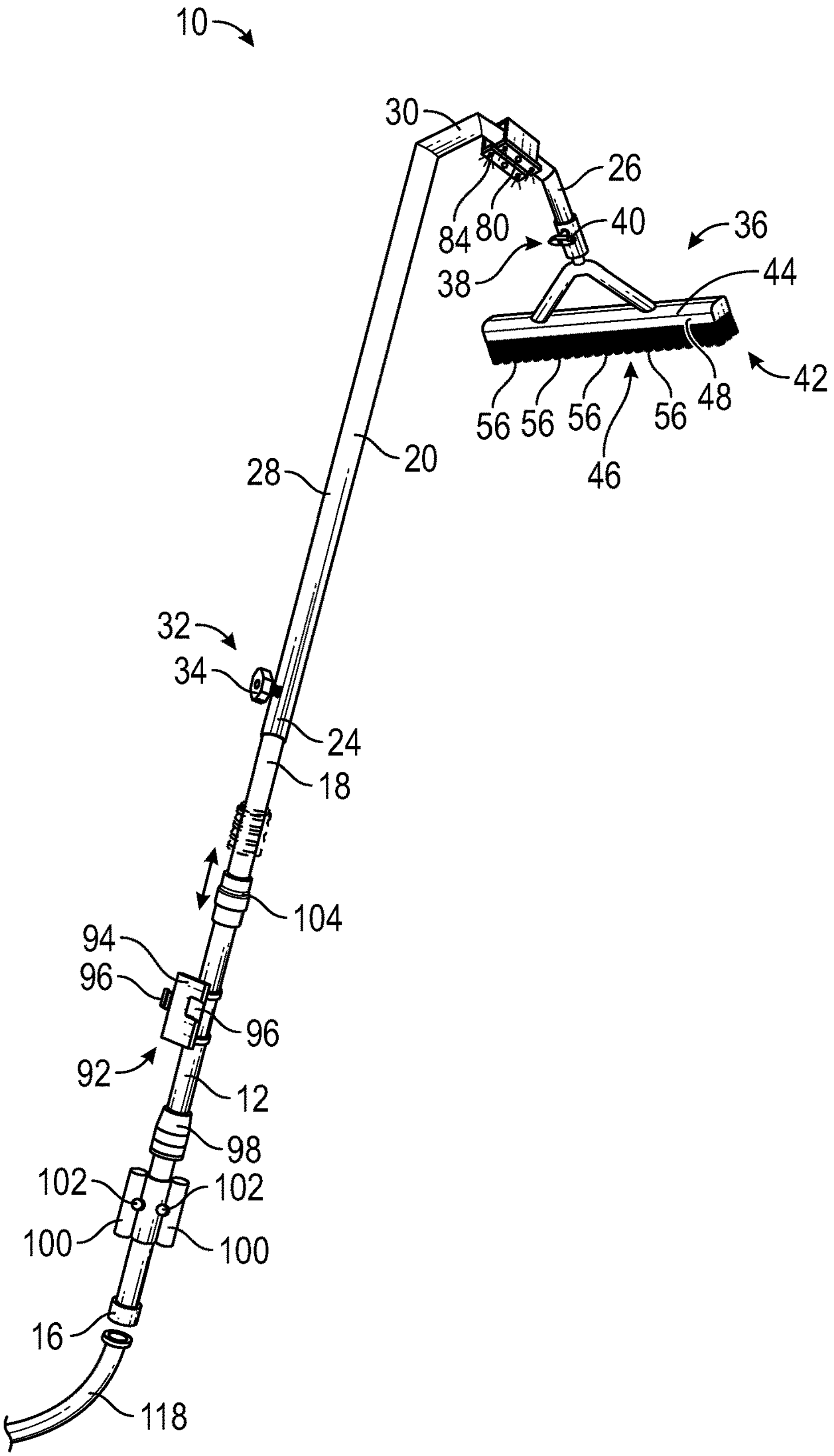
FIG. 1 is a perspective view of a washing apparatus according to an embodiment of the disclosure.
Figure 2:
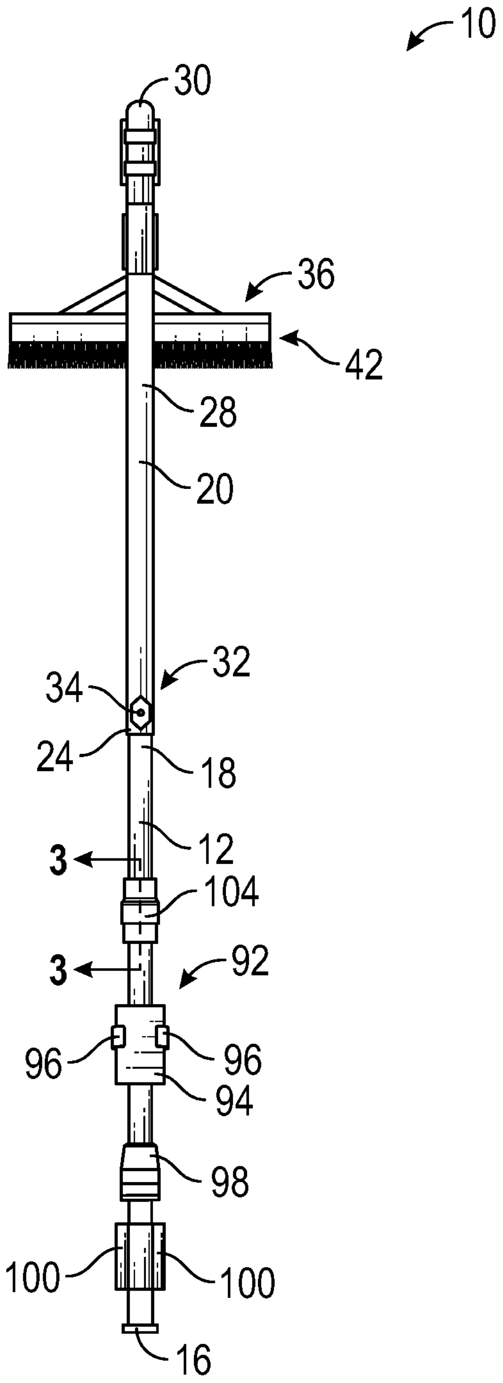
FIG. 2 is a front view of an embodiment of the disclosure.
Figure 3:
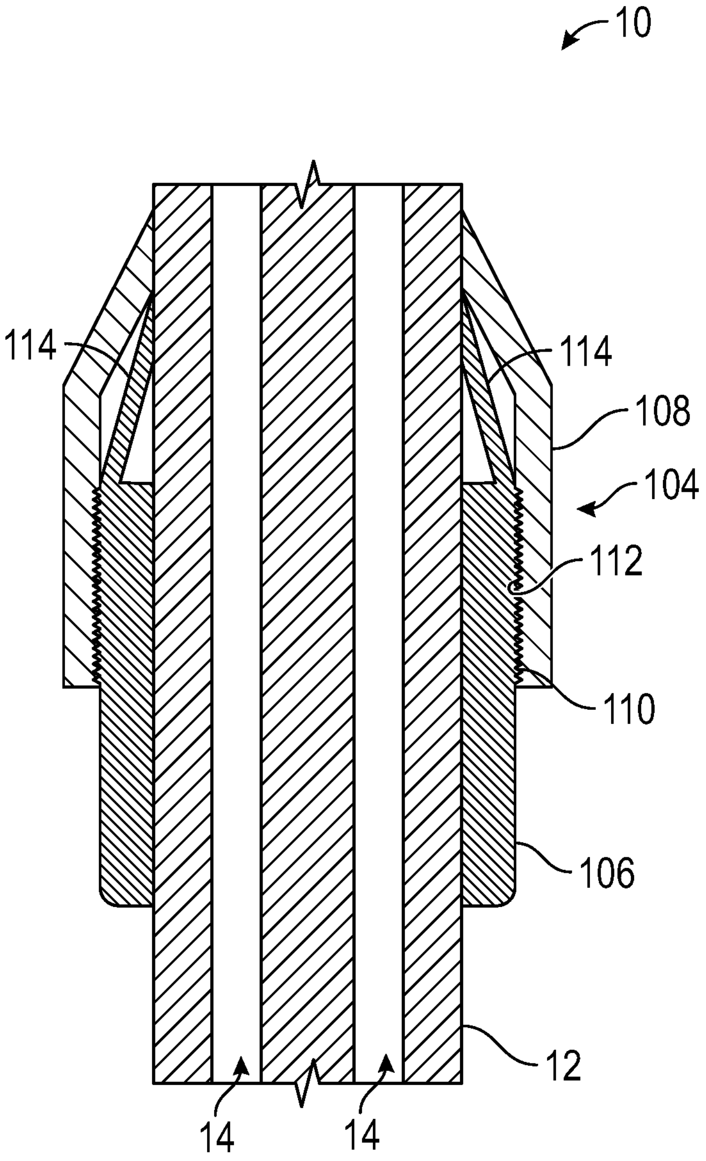
FIG. 3 is a cross-section view of an embodiment of the disclosure taken from Arrows 3-3 in FIG. 2.
Figure 4:
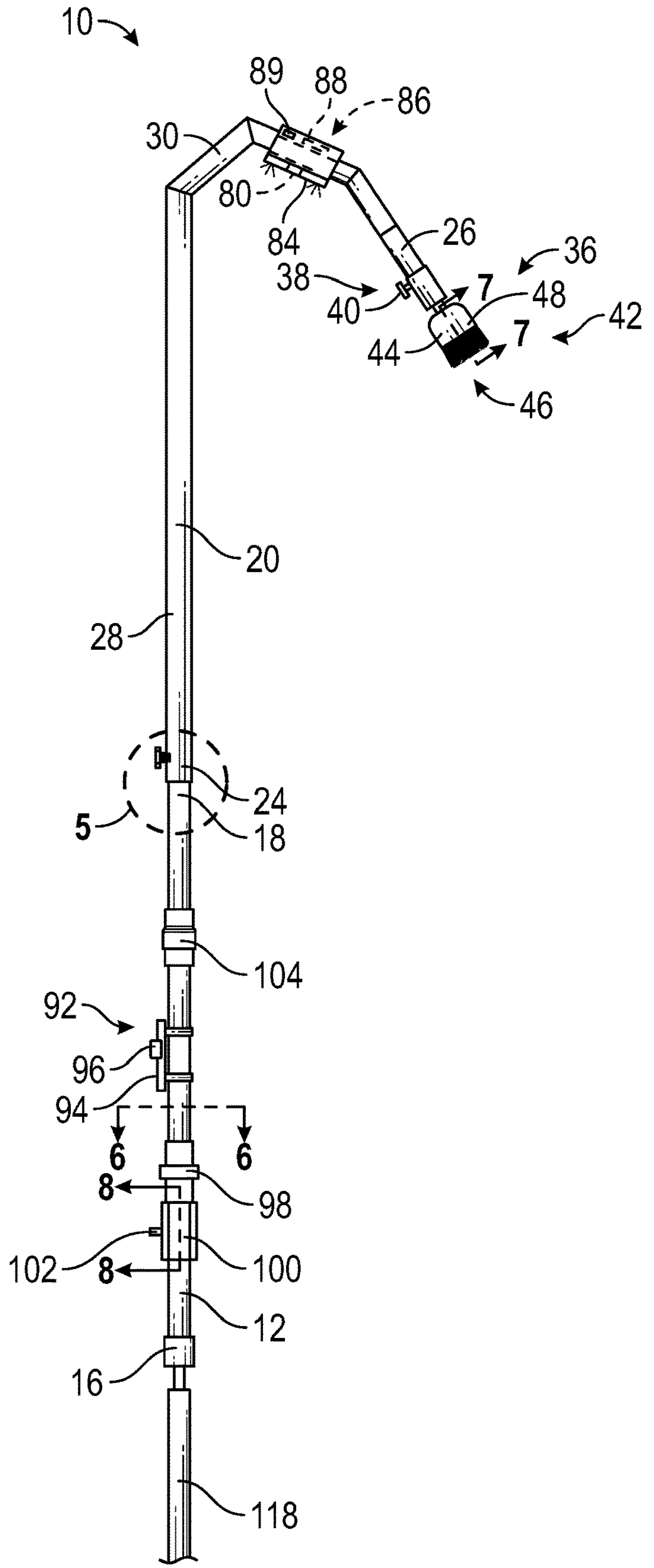
FIG. 4 is a side view of an embodiment of the disclosure.
Figure 5:
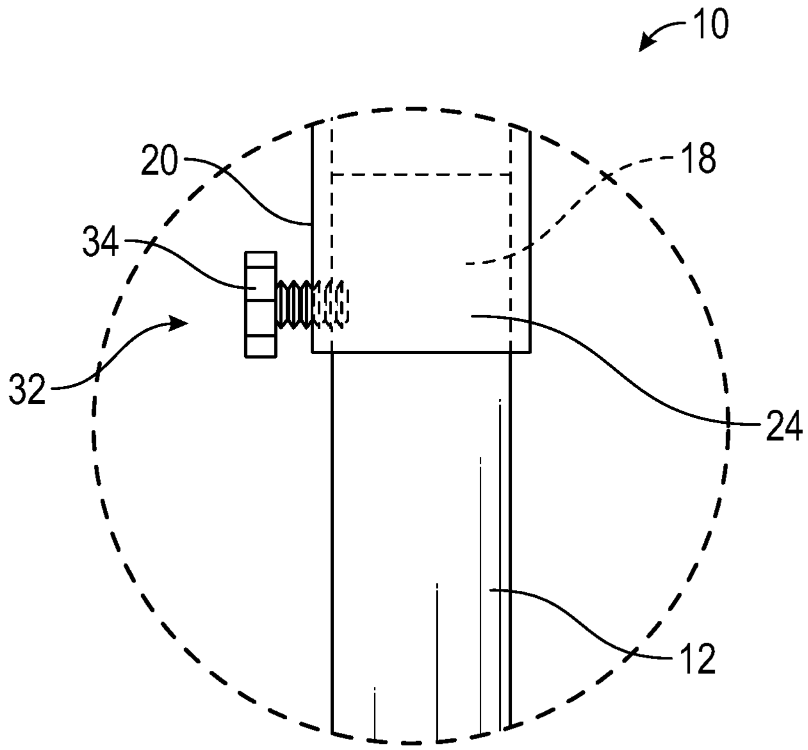
FIG. 5 is a detail view of an embodiment of the disclosure taken from Circle 5 in FIG. 4.
Figure 6:
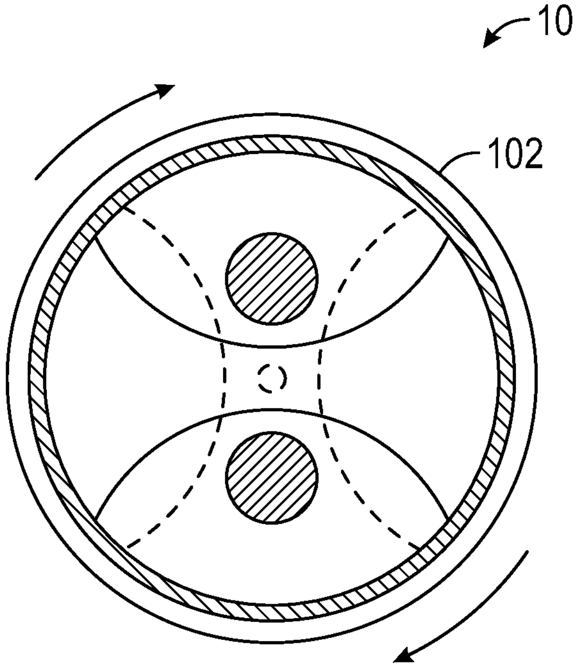
FIG. 6 is a cross-section view of an embodiment of the disclosure taken from Arrows 6-6 in FIG. 4.
Figure 7:
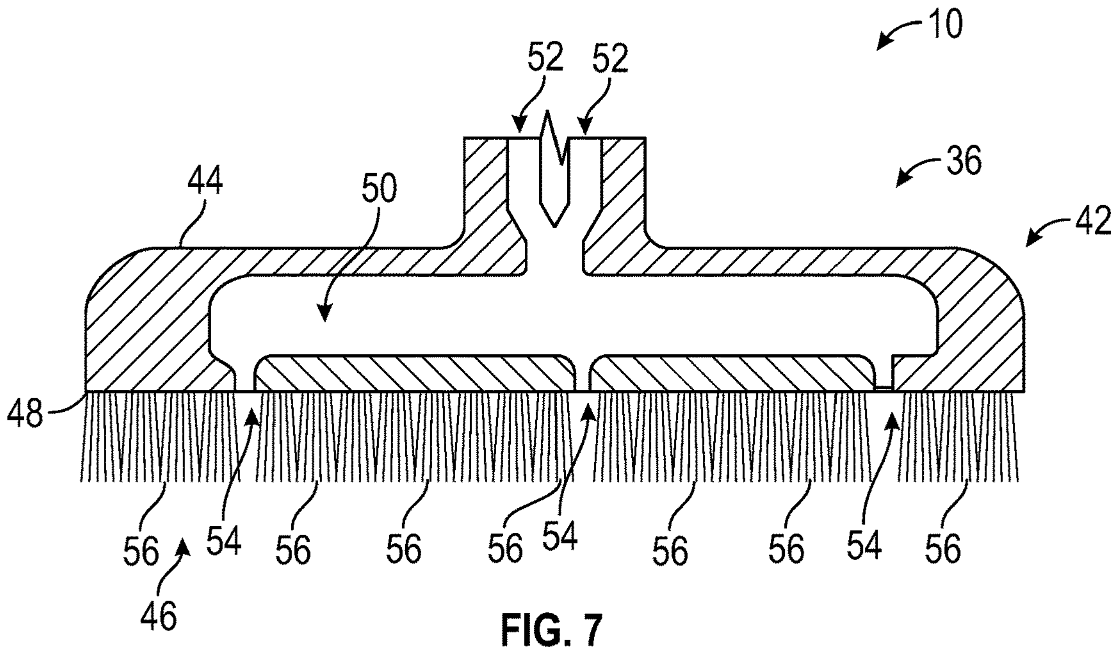
FIG. 7 is a cross-section view of an embodiment of the disclosure taken from Arrows 7-7 in FIG. 4.
Figure 8:
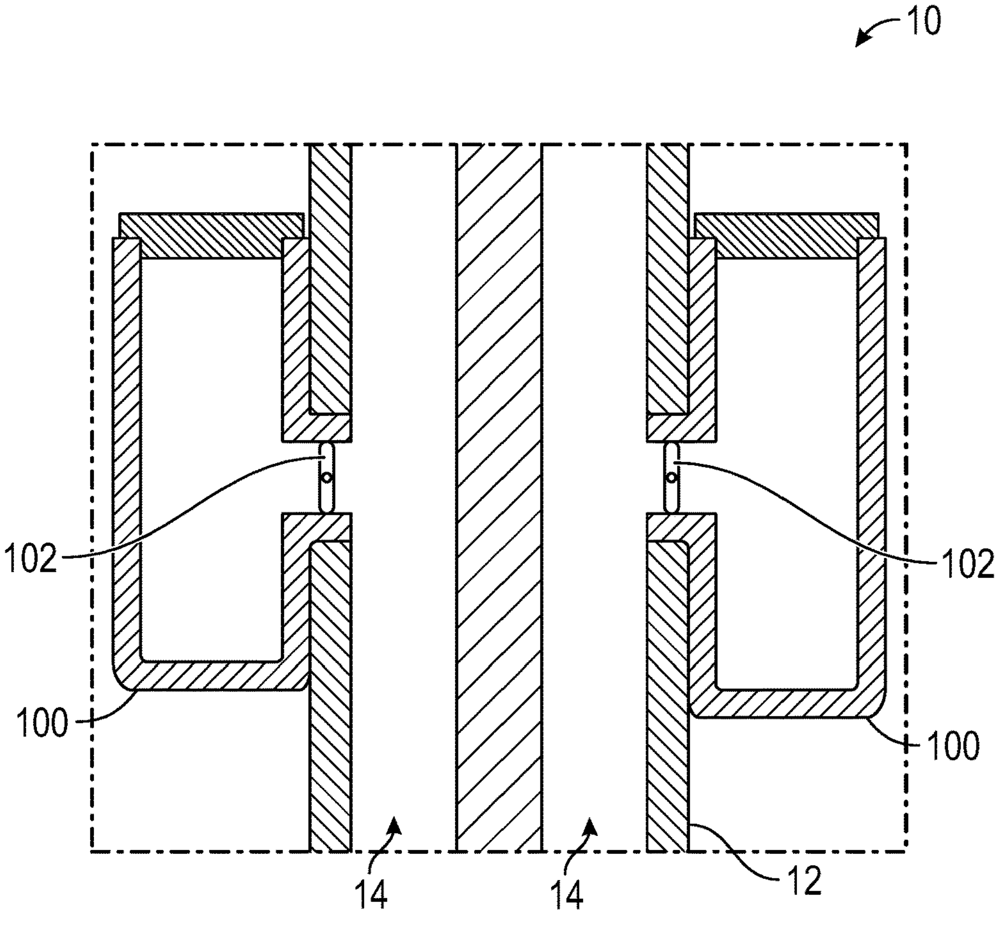
FIG. 8 is a cross-section view of an embodiment of the disclosure taken from Arrows 8-8 in FIG. 4.
Figure 9:
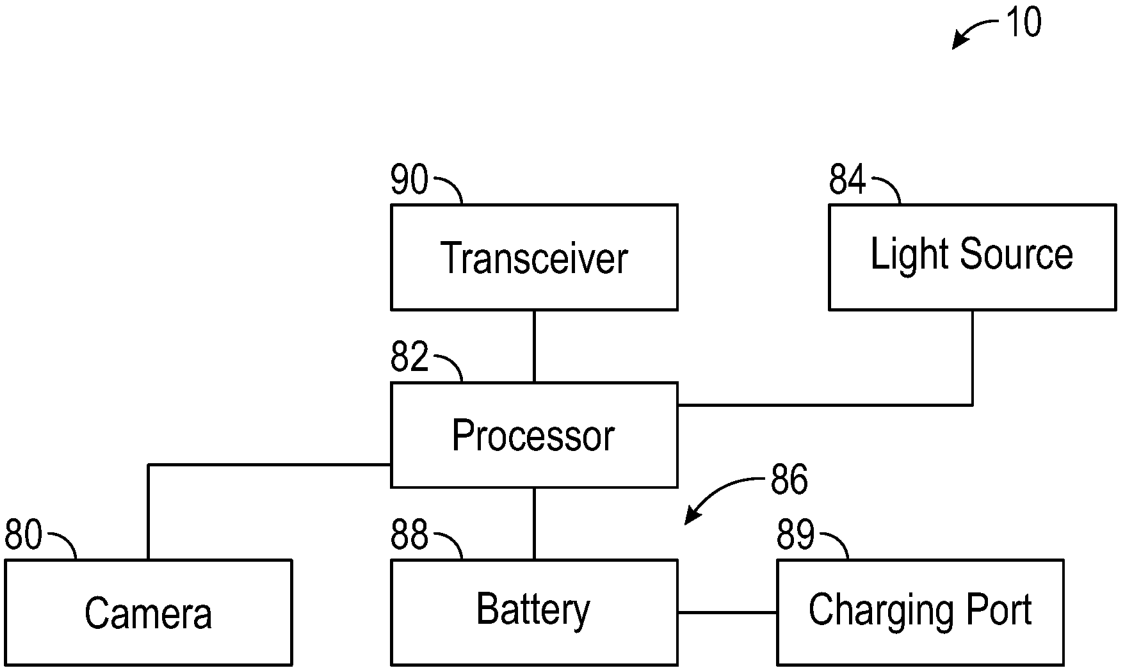
FIG. 9 is a block diagram of an embodiment of the disclosure.
Figure 10:
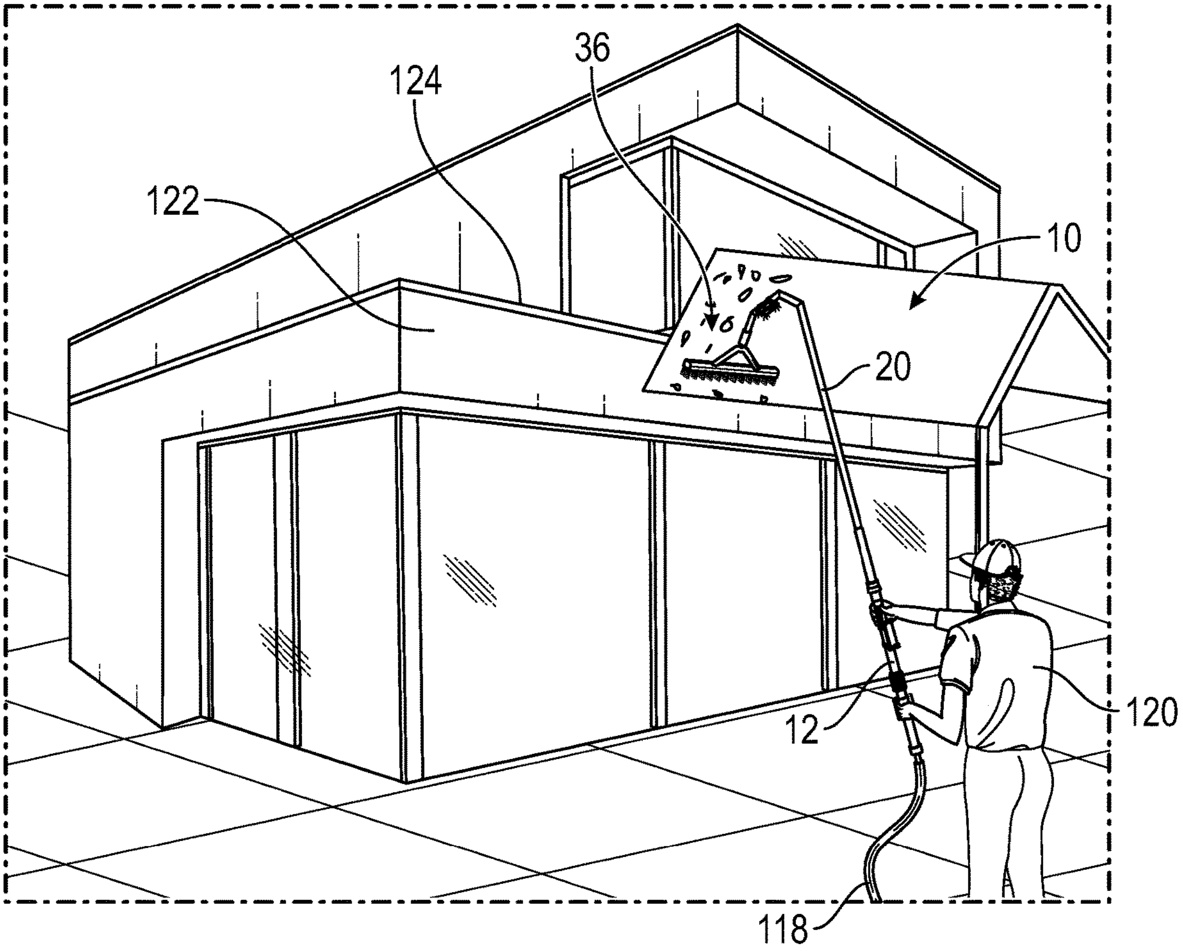
FIG. 10 is an in-use view of an embodiment of the disclosure.

With reference now to the drawings, and in particular to FIGS. 1 through 13 thereof, a new washing apparatus embodying the principles and concepts of an embodiment of the disclosure and generally designated by the reference numeral 10 will be described.

As best illustrated in FIGS. 1 through 13, the washing apparatus 10 generally comprises a base tube 12 defining a pair of base channels 14 in the base tube 12. Each base channel 14 of the pair of base channels 14 is open on a first end 16 and a second end 18 of the base tube 12. An adapter may be attached to the first end 16 to attach the base tube 12 to a hose 118 or other fluid source. An extension tube 20 is removably couplable to the second end 18 of the base tube 12 and a pair of extension channels 22 in the extension tube 20. Each extension channel 22 of the pair of extension channels 22 is open on a proximal end 24 and a distal end 26 of the extension tube 20 with respect to the base tube 12. Each extension channel 22 of the pair of extension channels 22 is in fluid communication with an associated base channel 14 of the pair of base channels 14 when the extension tube 20 is coupled to the second end 18 of the base tube 12. The extension tube 20 has an elongated portion 28 and a hooked portion 30, and the hooked portion 30 extends from the elongated portion 28 to the distal end 26 of the extension tube 20. A tube coupler 32 is coupled to the extension tube 20 and is operable to releasably couple the extension tube 20 to the second end 18 of the base tube 12. The tube coupler 32 comprises a tube set screw 34 but may comprise a latch, a threaded fastener, a magnetic fastener, or the like.

A plurality of cleaning attachments 36 is interchangeably couplable to either one of the distal end 26 of the extension tube 20 and the second end 18 of the base tube 12. Each cleaning attachment 36 of the plurality of cleaning attachments 36 comprises a connector 38 which is operable to releasably couple the cleaning attachment 36 to either one of the distal end 26 of the extension tube 20 and the second end 18 of the base tube 12. The connector 38 comprises an attachment set screw 40 but may comprise a latch, a threaded fastener, a magnetic fastener, or the like.

The plurality of cleaning attachments 36 includes a stationary scrubber attachment 42, a wiper attachment 58, and a rotating scrubber attachment 64. The plurality of cleaning attachments 36 also may include other attachments suitable for scrubbing, wiping, or otherwise physically cleaning surfaces, directing fluid 116 from the base tube 12 or the extension tube 20, or a combination thereof. The stationary scrubber attachment 42 comprises a head 44 and a stationary engagement member 46. The stationary engagement member 46 is mounted to an exterior 48 of the head 44. The head 44 defines a chamber 50 in the head 44 which has a pair of inlets 52 and a plurality of outlets 54. The pair of inlets 52 is in fluid communication with the pair of extension channels 22 when the stationary scrubber attachment 42 is coupled to the distal end 26 of the extension tube 20 and is in fluid communication with the pair of base channels 14 when the stationary scrubber attachment 42 is coupled to the second end 18 of the base tube 12. The plurality of outlets 54 is positioned adjacent to the stationary engagement member 46 so that the fluid 116 may be dispensed from the chamber 50 through the outlets 54 near the stationary engagement member 46. The stationary engagement member 46 is used to scrub surfaces and comprises a plurality of stationary bristles 56. The stationary engagement member 46 also may comprise a sponge, a mop, or the like.

The wiper attachment 58 comprises a wiper blade 60 which tapers to an edge 62. The wiper blade 60 comprises a resiliently compressible material such that the wiper blade 60 is configured to conform to a surface when the edge 62 of the wiper blade 60 is pressed against the surface. The resiliently compressible material may be, for example, rubber, silicone, or the like.

The rotating scrubber attachment 64 comprises a housing 66, a roller 72, a plurality of fins 74, and a rotating engagement member 76. The housing 66 defines a cavity 68 in the housing 66 which is in fluid communication with the pair of extension channels 22 when the rotating scrubber attachment 64 is coupled to the distal end 26 of the extension tube 20 and is in fluid communication with the pair of base channels 14 when the rotating scrubber attachment 64 is coupled to the second end 18 of the base tube 12. The cavity 68 has an opening 70 opposite the extension tube 20 when the rotating scrubber attachment 64 is coupled to the extension tube 20. The roller 72 is rotatably mounted in the housing 66 and protrudes through the opening 70. The roller 72 is positioned such that the roller 72 is configured to be urged to rotate by the fluid 116 moving from the extension tube 20 through the cavity 68 of the housing 66. The plurality of fins 74 is coupled to and radially spaced around the roller 72. The plurality of fins 74 is also positioned to facilitate rotation of the roller 72 by the fluid 116 moving from the extension tube 20 through the cavity 68 of the housing 66. When impacted by the fluid 116, the plurality of fins 74 urges the roller 72 to rotate. The rotating engagement member 76 is mounted to the roller 72 and is used to scrub surfaces. The rotating engagement member 76 comprises a plurality of rotating bristles 78 but may comprise a sponge, a mop, or the like.

A camera 80 is mounted to the extension tube 20 and is oriented to face a selected cleaning attachment 36 of the plurality of cleaning attachments 36 when the selected cleaning attachment 36 is coupled to the distal end 26 of the extension tube 20. The camera 80 is positioned on the hooked portion 30 of the extension tube 20. A processor 82 is operatively coupled to the camera 80. A light source 84 is operatively coupled to the processor 82 and is oriented to face the selected cleaning attachment 36 when the selected cleaning attachment 36 is coupled to the distal end 26 of the extension tube 20. A power source 86 is electrically coupled to the processor 82 and comprises a battery 88. A charging port 89 may be provided for charging the battery 88 from an electrical power source.

A transceiver 90 is operatively coupled to the processor 82 wherein the processor 82 is configured to be in wireless communication with a remote electronic device. The processor 82 is programmed such that the processor 82 is configured to receive commands from the remote electronic device and to selectively transmit images from the camera 80 to the remote electronic device. A device holder 92 is coupled to the base tube 12 and is shaped such that the device holder 92 is configured for holding the remote electronic device. The device holder 92 comprises a panel 94 and a pair of opposed clips 96. The pair of opposed clips 96 is coupled to the panel 94 and is configured to hold the remote electronic device therebetween via a snap fit.

A tube valve 98 is coupled to the base tube 12 and is movable between an open position and a closed position. The tube valve 98 is configured to permit the fluid 116 to travel through the pair of base channels 14 only when the tube valve 98 is positioned in the open position.

A pair of cleaning fluid containers 100 is mounted to the base tube 12. Each cleaning fluid container 100 of the pair of cleaning fluid containers 100 is configured to contain cleaning fluid and is in fluid communication with an associated base channel 14 of the pair of base channels 14. Each one of a pair of cleaning fluid valves 102 is coupled to an associated cleaning fluid container 100 of the pair of cleaning fluid containers 100. Each cleaning fluid valve 102 of the pair of cleaning fluid valves 102 is movable between an open position and a closed position and is configured to permit the cleaning fluid to move from the associated cleaning fluid container 100 to an associated base channel 14 of the pair of base channels 14 only when the cleaning fluid valve 102 is positioned in the open position. The cleaning fluid containers 100 may contain any fluid for use in cleaning surfaces such as soap, a degreasing agent, a rinsing agent, a surfactant, a foaming agent, or the like.

A handle 104 is mounted on the base tube 12. The handle 104 is movable along the base tube 12 between the first end 16 and the second end 18 and is securable in a selected position along the base tube 12. The handle 104 comprises an inner member 106 and an outer member 108. The outer member 108 is movable with respect to the inner member 106 to clamp the inner member 106 against the base tube 12. The outer member 108 has internal threads 112 which engage external threads 110 of the inner member 106 such that the outer member 108 moves linearly with respect to the inner member 106 when rotated with respect to the inner member 106. The inner member 106 comprises clamping fins 114 which the outer member 108 urges to clamp against the base tube 12 when the outer member 108 is urged against the clamping fins 114.

In use, the selected attachment is attached to either one of the base tube 12 and the extension tube 20. The selected attachment may be used to scrub, wipe, or otherwise physically clean surfaces. The extension tube 20 is particularly advantageous in permitting a user 120 positioned below an upper surface 124 of a structure 122 to clean the upper surface 124. The camera 80 may be used to view the upper surface 124 during this process. Another display screen may also be used to connect to the camera 80 and view the images recorded by the camera 80. Connections between the remote electronic device or other display screen to the processor 82 may also be wired.

Figure 11:
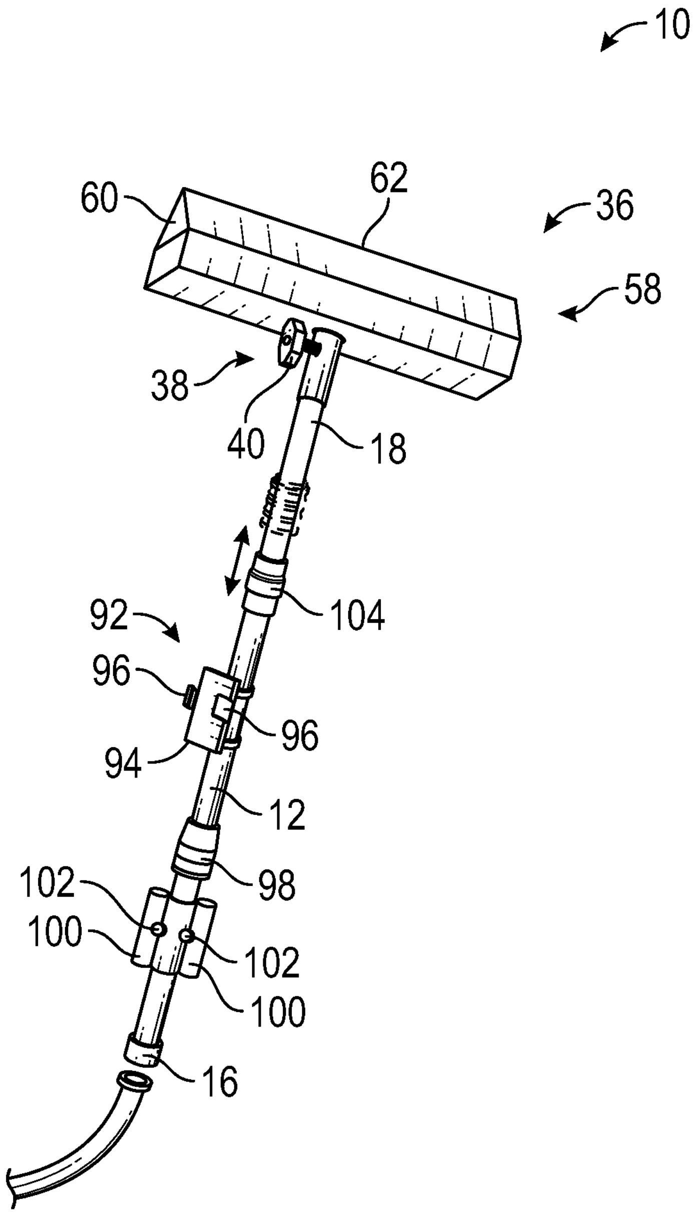
FIG. 11 is a perspective view of an embodiment of the disclosure.
Figure 12:
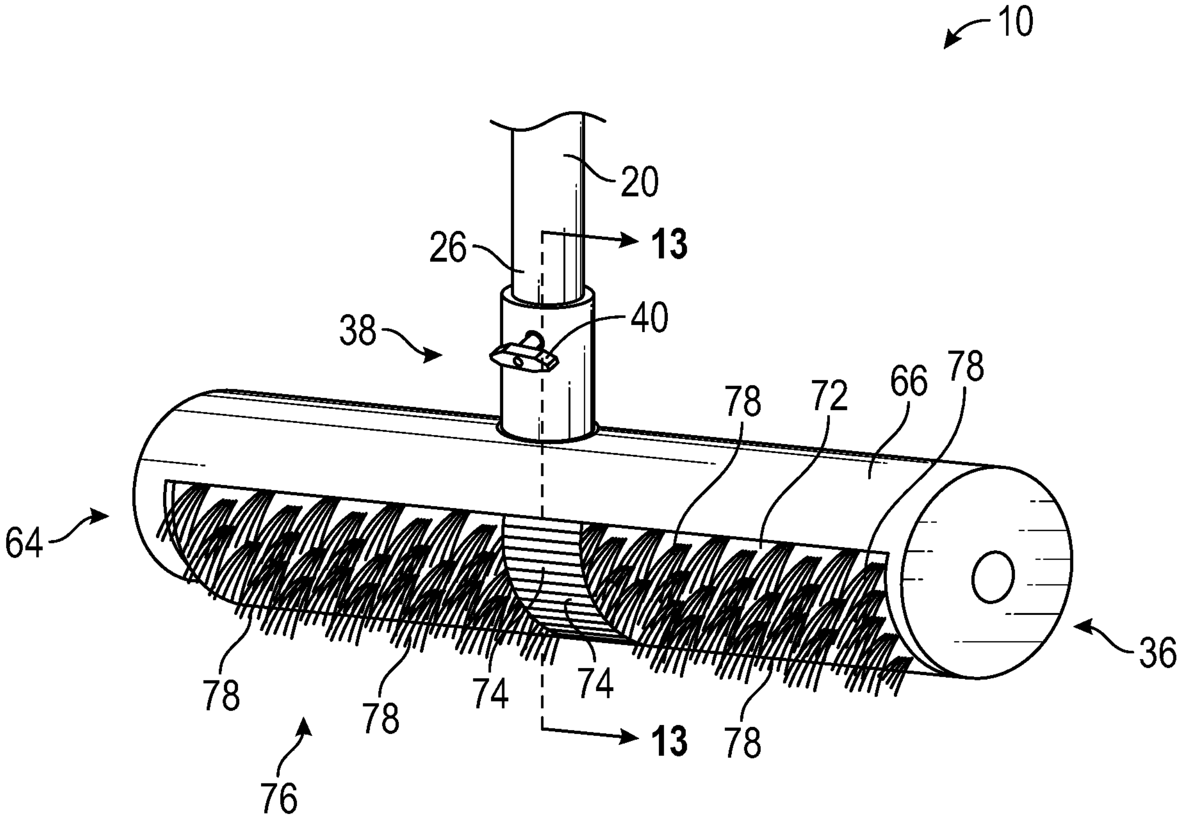
FIG. 12 is a detail perspective view of a rotating scrubber attachment of an embodiment of the disclosure.
Figure 13:
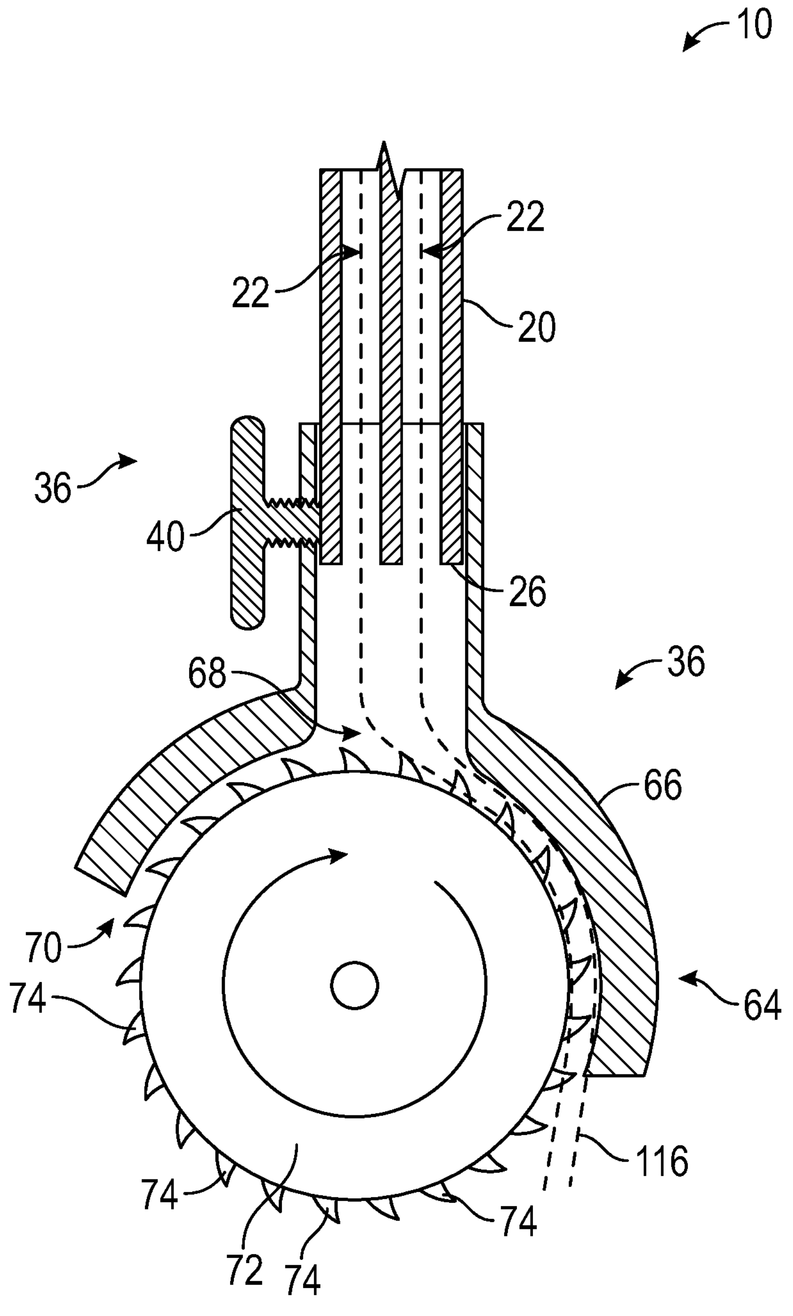
FIG. 13 is a cross-section view of an embodiment of the disclosure taken from Arrows 13-13 in FIG. 12.

The fluid 116, such as water or a cleaning solution, may be urged through the base tube 12 and the selected attachment toward a surface to be cleaned. When the selected attachment is attached to the extension tube 20 and the extension tube 20 is attached to the base tube 12, the fluid 116 may be directed from the first end 16 of the base tube 12, through the base tube 12, the extension tube 20, and the selected attachment to the surface to be cleaned. The stationary scrubber attachment 42 and the rotating scrubber attachment 64 may be alternately used to facilitate directing the fluid 116 from the extension tube 20 to the surface to be cleaned. The wiper attachment 58 as depicted in FIG. 11 does not have a conduit for transferring the fluid 116 but may have such a conduit in some embodiments.

The cleaning fluid containers 100 may contain distinct cleaning fluids which are able to be dispensed into associated ones of the pair of base channels 14, preventing any mixing of the cleaning fluids that could result until the cleaning fluids reach the selected attachment. Selected fluids for the distinct cleaning fluids may be used which are intended to be mixed at the selected attachment or which are meant to be used independently of each other.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A washing apparatus comprising:

a base tube defining a base channel in the base tube, the base channel being open on a first end and a second end of the base tube;

an extension tube being removably couplable to the second end of the base tube, the extension tube defining an extension channel in the extension tube, the extension channel being open on a proximal end and a distal end of the extension tube with respect to the base tube, the extension channel being in fluid communication with the base channel when the extension tube is coupled to the second end of the base tube;

a cleaning attachment being removably couplable to the distal end of the extension tube;

a camera being mounted to the extension tube, the camera being oriented to face the cleaning attachment when the cleaning attachment is coupled to the distal end of the extension tube;

a processor being operatively coupled to the camera and a handle being mounted on the base tube, the handle being movable along the base tube between the first end and the second end, the handle being securable in a selected position along the base tube, the handle comprising an inner member and an outer member, the outer member being movable with respect to the inner member to clamp the inner member against the base tube, the outer member having internal threads which engage external threads of the inner member such that the outer member moves linearly with respect to the inner member when rotated with respect to the inner member, the inner member comprising clamping fins which the outer member urges to clamp against the base tube when the outer member is urged against the clamping fins.

2. The apparatus of claim 1, wherein the cleaning attachment comprises a connector, the connector being operable to releasably couple the cleaning attachment to either one of the distal end of the extension tube and the second end of the base tube.

3. The apparatus of claim 2, wherein the connector comprises an attachment set screw.

4. The apparatus of claim 1, wherein the cleaning attachment is a stationary scrubber attachment comprising a head and a stationary engagement member, the stationary engagement member being mounted to an exterior of the head, the head defining a chamber in the head, the chamber having an inlet and an outlet, the inlet being in fluid communication with the extension channel when the stationary scrubber attachment is coupled to the distal end of the extension tube, the inlet being in fluid communication with the base channel when the stationary scrubber attachment is coupled to the second end of the base tube, the outlet being positioned adjacent to the stationary engagement member.

5. The apparatus of claim 4, wherein the stationary engagement member comprises a plurality of stationary bristles.

6. The apparatus of claim 1, wherein the cleaning attachment is a wiper attachment comprising a wiper blade.

7. The apparatus of claim 6, wherein the wiper blade tapers to an edge, the wiper blade comprising a resiliently compressible material such that the wiper blade is configured to conform to a surface when the edge of the wiper blade is pressed against the surface.

8. The apparatus of claim 1, wherein the cleaning attachment is a rotating scrubber attachment comprising:

a housing defining a cavity in the housing, the cavity being in fluid communication with the extension channel when the rotating scrubber attachment is coupled to the distal end of the extension tube, the cavity being in fluid communication with the base channel when the rotating scrubber attachment is coupled to the second end of the base tube, the cavity having an opening opposite the extension tube when the rotating scrubber attachment is coupled to the extension tube;

a roller being rotatably mounted in the housing and protruding through the opening, the roller being positioned such that the roller is configured to be urged to rotate by the fluid moving from the extension tube through the cavity of the housing; and a rotating engagement member being mounted to the roller.

9. The apparatus of claim 8, wherein the rotating engagement member comprises a plurality of rotating bristles.

10. The apparatus of claim 8, wherein the rotating scrubber attachment further comprises a plurality of fins being coupled to and radially spaced around the roller, the plurality of fins being positioned such that the plurality of fins urges the roller to rotate when impacted by the fluid moving from the extension tube through the cavity of the housing.

11. The apparatus of claim 1, wherein:

the extension tube has an elongated portion and a hooked portion, the hooked portion extending from the elongated portion to the distal end of the extension tube; and the camera being positioned on the hooked portion of the extension tube.

12. The apparatus of claim 1, further comprising a light source being operatively coupled to the processor, the light source being oriented to face the cleaning attachment when the cleaning attachment is coupled to the distal end of the extension tube.

13. The apparatus of claim 1, further comprising a power source being electrically coupled to the processor, the power source comprising a battery.

14. The apparatus of claim 1, further comprising a transceiver being operatively coupled to the processor wherein the processor is configured to be in wireless communication with a remote electronic device, the processor being programmed such that the processor is configured to receive commands from the remote electronic device, the processor being programmed such that the processor is configured to selectively transmit images from the camera to the remote electronic device.

15. The apparatus of claim 14, further comprising a device holder being coupled to the base tube, the device holder being shaped such that the device holder is configured for holding the remote electronic device, the device holder comprising a panel and a pair of opposed clips, the pair of opposed clips being coupled to the panel and being configured to hold the remote electronic device therebetween via a snap fit.

16. The apparatus of claim 1, further comprising a tube valve being coupled to the base tube and being movable between an open position and a closed position, the tube valve being configured to permit the fluid to travel through the base channel only when the tube valve is positioned in the open position.

17. The apparatus of claim 1, further comprising:

a pair of cleaning fluid containers being mounted to the base tube, each cleaning fluid container of the pair of cleaning fluid containers being in fluid communication with the base channel, each cleaning fluid container being configured to contain cleaning fluid; and a pair of cleaning fluid valves, each cleaning fluid valve of the pair of cleaning fluid valves being coupled to an associated cleaning fluid container of the pair of cleaning fluid containers, each cleaning fluid valve of the pair of cleaning fluid valves being movable between an open position and a closed position, each cleaning fluid valve of the pair of cleaning fluid valves being configured to permit the cleaning fluid to move from the associated cleaning fluid container to the base channel only when the cleaning fluid valve is positioned in the open position.

18. The apparatus of claim 1, further comprising a tube coupler being coupled to the extension tube, the tube coupler being operable to releasably couple the extension tube to the second end of the base tube, the tube coupler comprising a tube set screw.

19. A washing apparatus comprising:

a base tube defining a pair of base channels in the base tube, each base channel of the pair of base channels being open on a first end and a second end of the base tube;

an extension tube being removably couplable to the second end of the base tube, the extension tube defining a pair of extension channels in the extension tube, each extension channel of the pair of extension channels being open on a proximal end and a distal end of the extension tube with respect to the base tube, each extension channel of the pair of extension channels being in fluid communication with an associated base channel of the pair of base channels when the extension tube is coupled to the second end of the base tube, the extension tube having an elongated portion and a hooked portion, the hooked portion extending from the elongated portion to the distal end of the extension tube;

a plurality of cleaning attachments being interchangeably couplable to either one of the distal end of the extension tube and the second end of the base tube, each cleaning attachment of the plurality of cleaning attachments comprising a connector, the connector being operable to releasably couple the cleaning attachment to either one of the distal end of the extension tube and the second end of the base tube, the connector comprising an attachment set screw, the plurality of cleaning attachments including:

a stationary scrubber attachment comprising a head and a stationary engagement member, the stationary engagement member being mounted to an exterior of the head, the head defining a chamber in the head, the chamber having a pair of inlets and a plurality of outlets, the pair of inlets being in fluid communication with the pair of extension channels when the stationary scrubber attachment is coupled to the distal end of the extension tube, the pair of inlets being in fluid communication with the pair of base channels when the stationary scrubber attachment is coupled to the second end of the base tube, the plurality of outlets being positioned adjacent to the stationary engagement member, the stationary engagement member comprising a plurality of stationary bristles;

a wiper attachment comprising a wiper blade, the wiper blade tapering to an edge, the wiper blade comprising a resiliently compressible material such that the wiper blade is configured to conform to a surface when the edge of the wiper blade is pressed against the surface; and a rotating scrubber attachment comprising:

a housing defining a cavity in the housing, the cavity being in fluid communication with the pair of extension channels when the rotating scrubber attachment is coupled to the distal end of the extension tube, the cavity being in fluid communication with the pair of base channels when the rotating scrubber attachment is coupled to the second end of the base tube, the cavity having an opening opposite the extension tube when the rotating scrubber attachment is coupled to the extension tube;

a roller being rotatably mounted in the housing and protruding through the opening, the roller being positioned such that the roller is configured to be urged to rotate by the fluid moving from the extension tube through the cavity of the housing;

a plurality of fins being coupled to and radially spaced around the roller, the plurality of fins being positioned such that the plurality of fins urges the roller to rotate when impacted by the fluid moving from the extension tube through the cavity of the housing; and a rotating engagement member being mounted to the roller, the rotating engagement member comprising a plurality of rotating bristles;

a camera being mounted to the extension tube, the camera being oriented to face a selected cleaning attachment of the plurality of cleaning attachments when the selected cleaning attachment is coupled to the distal end of the extension tube, the camera being positioned on the hooked portion of the extension tube;

a processor being operatively coupled to the camera;

a light source being operatively coupled to the processor, the light source being oriented to face the selected cleaning attachment when the selected cleaning attachment is coupled to the distal end of the extension tube;

a power source being electrically coupled to the processor, the power source comprising a battery;

a transceiver being operatively coupled to the processor wherein the processor is configured to be in wireless communication with a remote electronic device, the processor being programmed such that the processor is configured to receive commands from the remote electronic device, the processor being programmed such that the processor is configured to selectively transmit images from the camera to the remote electronic device;

a device holder being coupled to the base tube, the device holder being shaped such that the device holder is configured for holding the remote electronic device, the device holder comprising a panel and a pair of opposed clips, the pair of opposed clips being coupled to the panel and being configured to hold the remote electronic device therebetween via a snap fit;

a tube valve being coupled to the base tube and being movable between an open position and a closed position, the tube valve being configured to permit the fluid to travel through the pair of base channels only when the tube valve is positioned in the open position;

a pair of cleaning fluid containers being mounted to the base tube, each cleaning fluid container of the pair of cleaning fluid containers being in fluid communication with an associated base channel of the pair of base channels, each cleaning fluid container being configured to contain cleaning fluid;

a pair of cleaning fluid valves, each cleaning fluid valve of the pair of cleaning fluid valves being coupled to an associated cleaning fluid container of the pair of cleaning fluid containers, each cleaning fluid valve of the pair of cleaning fluid valves being movable between an open position and a closed position, each cleaning fluid valve of the pair of cleaning fluid valves being configured to permit the cleaning fluid to move from the associated cleaning fluid container to an associated base channel of the pair of base channels only when the cleaning fluid valve is positioned in the open position;

a handle being mounted on the base tube, the handle being movable along the base tube between the first end and the second end, the handle being securable in a selected position along the base tube, the handle comprising an inner member and an outer member, the outer member being movable with respect to the inner member to clamp the inner member against the base tube, the outer member having internal threads which engage external threads of the inner member such that the outer member moves linearly with respect to the inner member when rotated with respect to the inner member, the inner member comprising clamping fins which the outer member urges to clamp against the base tube when the outer member is urged against the clamping fins; and a tube coupler being coupled to the extension tube, the tube coupler being operable to releasably couple the extension tube to the second end of the base tube, the tube coupler comprising a tube set screw.

* * * * *